US012556575B2

(12) United States Patent
Yao et al.

(10) Patent No.: US 12,556,575 B2
(45) Date of Patent: Feb. 17, 2026

(54) WEBSITE ACCESS WORKFLOW

(71) Applicant: Citrix Systems, Inc., Ft. Lauderdale, FL (US)

(72) Inventors: Peng Yao, Nanjing (CN); Lei Zhou, Nanjing (CN); Tianyu Xiao, Nanjing (CN)

(*) Notice: Subject to any disclaimer, the term of this patent is extended or adjusted under 35 U.S.C. 154(b) by 738 days.

(21) Appl. No.: 17/735,680

(22) Filed: May 3, 2022

(65) Prior Publication Data

US 2023/0319107 A1    Oct. 5, 2023

Related U.S. Application Data

(63) Continuation of application No. PCT/CN2022/084466, filed on Mar. 31, 2022.

(51) Int. Cl.
*H04L 9/40* (2022.01)
*G06F 16/955* (2019.01)

(52) U.S. Cl.
CPC ...... *H04L 63/1483* (2013.01); *G06F 16/9566* (2019.01)

(58) Field of Classification Search
CPC .................. H04L 63/1483; G06F 16/9566
See application file for complete search history.

(56) References Cited

U.S. PATENT DOCUMENTS

| 10,027,702 | B1* | 7/2018 | Oliver | H04L 63/1483 |
| 2020/0252428 | A1* | 8/2020 | Gardezi | H04L 63/1416 |
| 2021/0014269 | A1* | 1/2021 | Devane | H04L 63/1483 |
| 2021/0021638 | A1* | 1/2021 | Lancioni | H04L 63/1433 |

* cited by examiner

*Primary Examiner* — Clayton R Williams

(57) ABSTRACT

A website access workflow includes receiving, from a browser associated with a user, a Universal Resource Locator (URL) associated with a website; comparing the URL with at least one domain name in a user domain name list associated with the user to determine whether the URL exists in the domain name list; in response to determining that the URL does not exist in the user domain name list, adding the URL to the user domain name list; and in response to a visit count representing a number of visits to the URL by the user being less than a threshold value, causing the browser to display a warning message. In response to receiving, from the browser, a user confirmation that the website is not malicious, the workflow includes sending permission to the browser to access the website using the URL and incrementing the visit count by one.

9 Claims, 10 Drawing Sheets

116a

| User 1 | |
|---|---|
| Domain Name | Visit Count |
| bing.com | 3456 |
| archive.org | 1234 |
| abc.net | 1 |
| ... | |

FIG. 2C

WEBSITE ACCESS WORKFLOW

RELATED APPLICATION

This application claims priority under 35 U.S.C. § 120 as a continuation of PCT Application No. PCT/CN2022/084466, entitled "WEB SITE ACCESS WORKFLOW" and filed Mar. 31, 2022. PCT Application No. PCT/CN2022/084466 is hereby incorporated herein by reference in its entirety.

BACKGROUND

The Internet is an inherently insecure channel for electronic information exchange between computing devices. Among the risks that have been identified in conjunction with Internet usage are intrusions, breaches of computing defenses, distribution of viruses and malware, and fraud. Internet security involves practices and procedures intended to combat security threats and mitigate such risks. Since no single solution is sufficient, a multilayered approach is often adopted. For instance, as part of efforts to improve Internet security, governments, search engine services, and other authoritative bodies have implemented laws, protocols, and standards intended to regulate online activities. Additionally, countermeasures are typically deployed at the physical level, such as cryptographic communication protocols, encryption of data, firewalls, and filters. However, many existing techniques are slow to evolve and adapt to rapidly changing threat conditions, and thus vulnerabilities to Internet security remain an ongoing concern even in the presence of a comprehensive suite of security measures.

SUMMARY

One example provides a method of accessing a website. The method includes receiving, by a processor and from a browser associated with a user, a Universal Resource Locator (URL) associated with a website; comparing, by the processor, the URL with at least one domain name in a user domain name list associated with the user to determine whether the URL exists in the domain name list; in response to determining that the URL does not exist in the user domain name list, adding, by the processor, the URL to the user domain name list; and in response to a visit count representing a number of visits to the URL by the user being less than a threshold value, causing, by the processor, the browser to display a warning message.

In some examples, the method includes, in response to receiving, by the processor and from the browser, a user confirmation that the website is not malicious, sending, by the processor, permission to the browser to access the website using the URL. In some examples, the method includes, in response to sending permission to the browser to access the website using the URL, incrementing, by the processor, the visit count by one. In some examples, the method includes, in response to receiving, by the processor and from the browser, a user message that the website is malicious, sending, by the processor, the URL to an administrator. In some examples, the method includes comparing, by the processor, the URL with at least one domain name in a blacklist to determine whether the URL exists in the blacklist; and in response to determining that the URL exists in the blacklist, causing, by the processor, the browser to block access to the website. In some examples, the method includes comparing, by the processor, the URL with at least one domain name in a whitelist to determine whether the URL exists in the whitelist; and in response to determining that the URL exists in the whitelist, causing, by the processor, the browser to permit access to the website. In some examples, the method includes receiving, by a processor and from a plurality of browsers associated with a plurality of users within a predetermined period of time, a Universal Resource Locator (URL) associated with a web site; and sending, by the processor, the URL to an administrator.

Another example provides a computer program product including one or more non-transitory machine-readable mediums having instructions encoded thereon that when executed by at least one processor cause a process to be carried out. The process includes receiving, from a browser associated with a user, a Universal Resource Locator (URL) associated with a website; comparing the URL with at least one domain name in a user domain name list associated with the user to determine whether the URL exists in the domain name list; in response to determining that the URL does not exist in the user domain name list, adding the URL to the user domain name list; and in response to a visit count representing a number of visits to the URL by the user being less than a threshold value, causing the browser to display a warning message.

In some examples, the process includes, in response to receiving, from the browser, a user confirmation that the website is not malicious, sending permission to the browser to access the website using the URL. In some examples, the process includes, in response to sending permission to the browser to access the website using the URL, incrementing the visit count by one. In some examples, the process includes, in response to receiving, from the browser, a user message that the website is malicious, sending, by the processor, the URL to an administrator. In some examples, the process includes comparing the URL with at least one domain name in a blacklist to determine whether the URL exists in the blacklist; and in response to determining that the URL exists in the blacklist, causing the browser to block access to the website. In some examples, the process includes comparing the URL with at least one domain name in a whitelist to determine whether the URL exists in the whitelist; and in response to determining that the URL exists in the whitelist, causing the browser to permit access the website. In some examples, the process includes receiving, from a plurality of browsers associated with a plurality of users within a predetermined period of time, a Universal Resource Locator (URL) associated with a website; and sending the URL to an administrator.

Yet another example provides a system including a storage and at least one processor operatively coupled to the storage. The at least one processor is configured to execute instructions stored in the storage that when executed cause the at least one processor to carry out a process. The process includes receiving, from a browser associated with a user, a Universal Resource Locator (URL) associated with a website; comparing the URL with at least one domain name in a user domain name list associated with the user to determine whether the URL exists in the domain name list; in response to determining that the URL does not exist in the user domain name list, adding the URL to the user domain name list; and in response to a visit count representing a number of visits to the URL by the user being less than a threshold value, causing the browser to display a warning message.

In some examples, the process includes, in response to receiving, from the browser, a user confirmation that the website is not malicious, sending permission to the browser to access the website using the URL. In some examples, the process includes, in response to sending permission to the browser to access the website using the URL, incrementing the visit count by one. In some examples, the process includes, in response to receiving, from the browser, a user message that the website is malicious, sending, by the processor, the URL to an administrator. In some examples, the process includes comparing the URL with at least one domain name in a blacklist to determine whether the URL exists in the blacklist; in response to determining that the URL exists in the blacklist, causing the browser to block access to the website; comparing the URL with at least one domain name in a whitelist to determine whether the URL exists in the whitelist; and in response to determining that the URL exists in the whitelist, causing the browser to permit access the website. In some examples, the process includes receiving, from a plurality of browsers associated with a plurality of users within a predetermined period of time, a Universal Resource Locator (URL) associated with a website; and sending the URL to an administrator.

Other aspects, examples, and advantages of these aspects and examples, are discussed in detail below. It will be understood that the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

FIGS. 2A-C show content of a blacklist, a whitelist, and a user domain name list of the system of FIG. 1, in accordance with an example of the present disclosure.

DETAILED DESCRIPTION

Figure 1:
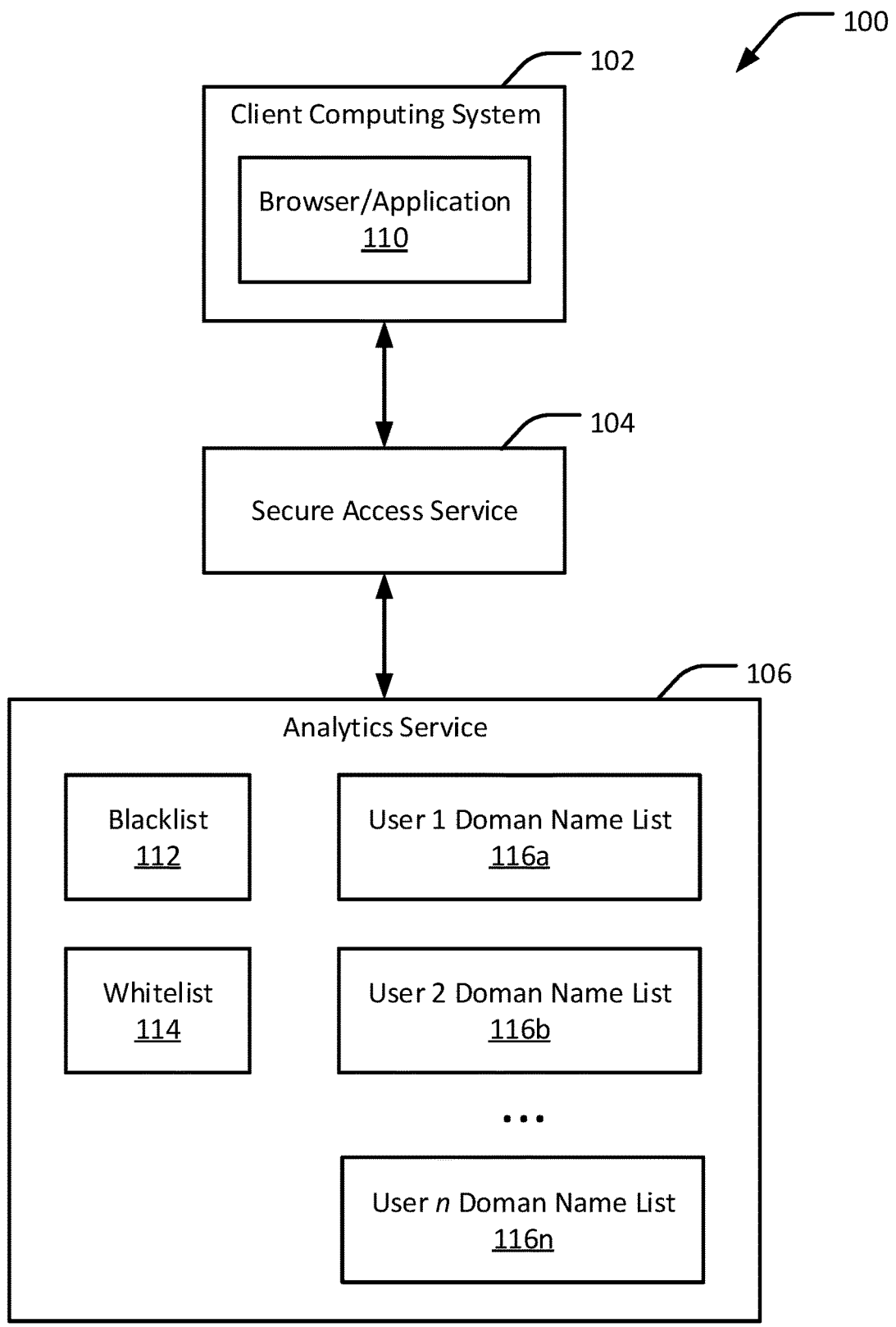
FIG. 1 is a block diagram of a system for website access workflow, in accordance with an example of the present disclosure.

According to examples of the present disclosure, techniques for a website access process are provided. In overview, the process determines whether a user is attempting to access a website that is not blacklisted or whitelisted and warns the user in such situations. For example, the process includes receiving, from a browser associated with a user, a Universal Resource Locator (URL) associated with a website. For example, the URL can be a hyperlink in a webpage displayed on the browser or an Internet Protocol (IP) address or website address that the user has manually entered into the browser. The URL is compared with at least one domain name in a user domain name list associated with the user to determine whether the URL exists in the domain name list (e.g., to determine whether the user is visiting the website for the first time). The domain name list maintains a list of URLs and corresponding visit counts by that user to the respective website(s). In response to determining that the URL does not exist in the user domain name list, the URL is added to the user domain name list. This occurs the first time the user has attempted to visit the website. If a visit count representing a number of visits to the URL by the user is less than a threshold value, then the browser displays a warning message to the user. The warning message can indicate, among other things, that the URL the user is attempting to access is potentially malicious or otherwise insecure and requesting the user to confirm that the website is not malicious. If the user confirms that the website is not malicious, then permission is sent to the browser to access the website using the URL, and the visit count for the respective URL in the domain name list is incremented. In cases where the user does not confirm that the website is not malicious, the URL can be sent to an administrator for further evaluation to determine, for instance, whether the URL is safe or malicious.

Overview

A resource on the Internet, such as a webpage or other content, is commonly accessed via a URL that can be resolved into a unique network address for accessing the corresponding resource via a web browser or other application. As noted above, Internet security can take on several forms, including filtering and other restrictions based on the URL. For example, certain websites are known to be, or are at risk of being, potentially unsecure. For such websites, the corresponding URLs can be blacklisted to prevent or restrict access to those websites. A blacklist is a list of such URLs and is used to block a browser or other application from accessing the website. In some cases, an attempt by a browser to access a URL on a blacklist will also present the user with a warning message before allowing access to the website, while in other cases no access to the website is permitted. Conversely, a whitelist is a list of URLs that are trusted to be safe and secure. Attempts to access a URL on a whitelist is usually permitted without restriction.

Blacklists and whitelists are often managed by local system administrators or by enterprises that provide Internet security services. This is a largely manual process involving human judgment. Although some limited automated maintenance of the lists can be accomplished using rudimentary filtering and analysis techniques, inevitably human intervention is needed to validate the entries on the lists. However, typically decisions to blacklist or whitelist a given URL are made by individuals tasked with such duties. Therefore, the process of maintaining the lists is labor intensive and any delays in processing new information relevant to these lists increases the risk that a user may inadvertently access a malicious website.

To this end, a website access workflow is provided herein. In general, an analytics service is provided within a computing environment (e.g., a distributed processing network or virtual machine) for managing access to URLs. The analytics service maintains at least three lists: a blacklist, a whitelist, and a domain name list that is unique for each user. While URLs on the blacklist and the whitelist can be used for evaluating access requests from multiple users, the user-specific domain name list records URLs on a user-by-user basis. When a given user attempts to access a URL that is already on a blacklist, access to the URL is blocked. When that user attempts to access a URL that is already on a whitelist, access to the URL is granted. The blacklist and the whitelist are maintained by an administrator or other entity. However, when that user attempts to access a URL that user has never, or rarely, previously visited, the user receives a warning message that the URL is potentially unsafe. The user can then decide to proceed to the website or cancel the access attempt. If the user decides to proceed, the user sends a confirmation to the analytics service, which increments a visit count for the URL in the user-specific domain name list. If the user instead cancels the access attempt, the analytics service blocks access to the URL.

A threshold visit count can be established for the user. As noted above, each time the user visits a URL that is not on a whitelist, the analytics service increments the visit count for the URL. The visit count is stored in the user-specific domain name list along with the corresponding URL. Each URL in the user-specific domain name list has a separate visit count for the respective user, and each user has a separate user-specific domain name list. If, when a user attempts to access a URL, the visit count in the domain name list for that user is less than the threshold visit count, the analytics service sends the warning message to the browser; otherwise, the analytics service permits access to the URL without sending a warning message to the browser and without requiring the user to send a confirmation back to the analytics service. In this manner, after the user has confirmed that he or she wishes to access the URL a certain number of times (determined by the threshold visit count), the analytics service no longer warns the user when the user next attempts to access the URL.

In some examples, when multiple users each attempt to access a URL that is not on the blacklist or the whitelist, the analytics service can send a message to the administrator indicating that multiple users are attempting to access the same URL. The administrator can then take appropriate action to blacklist the URL or whitelist the URL, or take other countermeasures as needed.

Example Website Access Workflow System

FIG. 1 is a block diagram of a system 100 for website access workflow, in accordance with an example of the present disclosure. The system 100 includes a client computing system 102, a secure access service 104, and an analytics service 106. The client computing system 102 includes a browser 110 or other application configured to access a URL. The analytics service 106 includes a blacklist 112, a whitelist 114, and at least one user domain name list 116a . . . 116n.

Figure 2A:
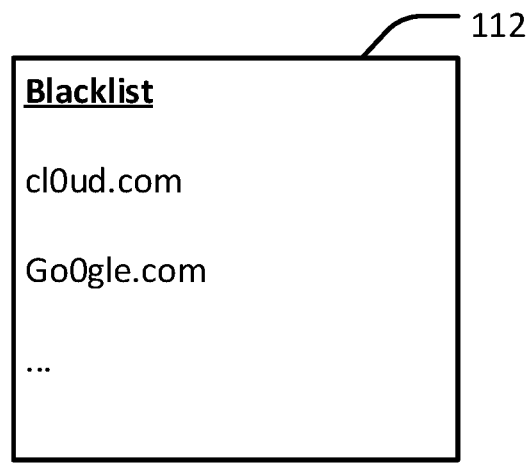
Figure 2B:

FIGS. 2A-C show the content of the blacklist 112, the whitelist 114, and one of the user domain name lists 116a, in accordance with an example of the present disclosure. In FIG. 2A, the blacklist 112 includes URL entries: cl0ud.com and Go0gle.com. The URL entries in the blacklist 112 are known malicious or otherwise prohibited domains. These URL entries are blacklisted and if the user attempts to access any of these URLs, the analytics service 106 will report the blacklisted results to the secure access service 104, which in turn will block the browser 110 from accessing the URL. In FIG. 2B, the whitelist 114 includes URL entries: cloud.com and Google.com. The URL entries in the whitelist 114 are known safe domains, such as company domains, office-related domains, and other common domains or domains that have been vetted by the administrators. These URL entries are whitelisted and if the user attempts to access any of these URLs, the analytics service 106 will report the whitelisted results to the secure access service 104, which in turn will permit the browser 110 to access the URL.

In FIG. 2C, the domain name list 116a for User 1 includes URL entries: bing.com; archive.org; and abc.net. For each of these URL entries there is a corresponding visit count: 3456; 1234; and 1, respectively. The visit count represents the number of times User 1 has visited the respective URL. The analytics service 106 uses the information in the blacklist 112, the whitelist 114, and each of the domain name lists 116a . . . 116n each time a user requests access to any URL, as described in further detail below.

Example Website Access Workflows

Figure 3:
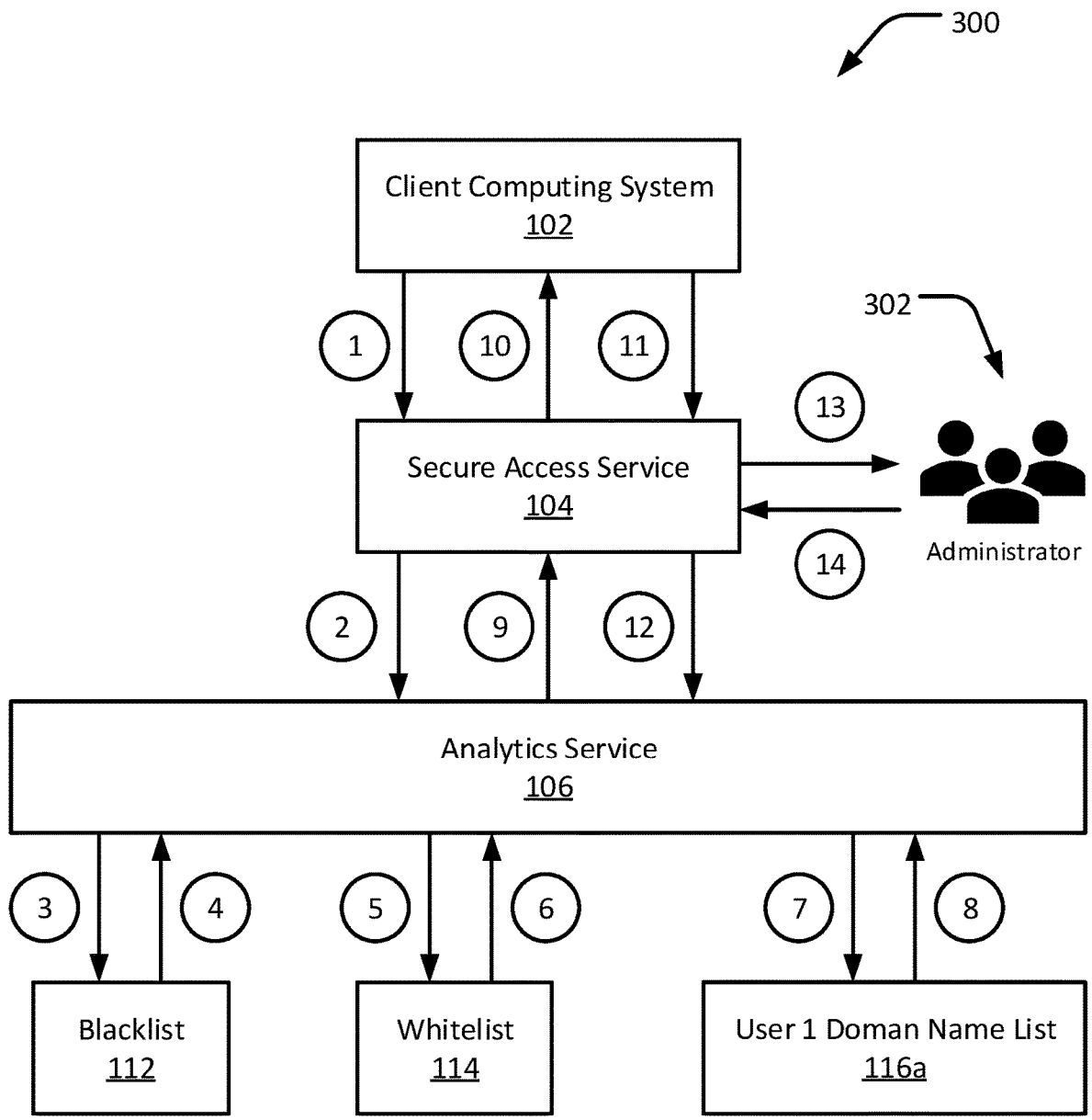
FIGS. 3, 4, 5, and 6 are flow diagrams of website access workflows, in accordance with several examples of the present disclosure.

FIG. 3 is a flow diagram of a website access workflow 300, in accordance with an example of the present disclosure. The workflow 300 can occur when a user attempts to open a webpage URL that is not in the blacklist 112 or the whitelist 114. In some cases, this is the first attempt by the user to open the webpage. Initially, the user opens a webpage URL, or hyperlink, from within the client computing system 102. The client computing system 102 sends the URL to the secure access service 104 (step 1). In response to receiving the URL from the client computing system 102, the secure access service 104 requests an analysis of the URL by the analytics service 106 (step 2). The analytics service 106 compares the URL with the records in the blacklist 112 to determine whether the URL belongs to a known domain of a malicious websites (step 3). In the example of FIG. 3, the analytics service 106 obtains the result that no record was found in the blacklist 112 (step 4).

Next, the analytics service 106 compares the URL with the records in the whitelist 114 to determine whether the URL belongs to a known domain of secure websites (step 5). In some examples, step 5 can be further extended as follows: if no record is found in the whitelist 114, then the analytics service 106 determines whether the domain of the URL is similar to a known secure domain in the whitelist 114, which is an indication of a potential phishing risk. The secure access service 104 can inform the administrator 302 for further investigation of the URL to determine whether it should be blacklisted or whitelisted.

In the example of FIG. 3, the analytics service 106 obtains the result that no record was found in the whitelist 114 (step 6). The analytics service 106 then compares the URL with the records in the domain name list 116a for the user (step 7). If no matching record is found in the domain name list 116a, then the analytics service 106 adds the URL domain record to the domain name list 116a and sets the visit count to one. The analytics service 106 then obtains the result of the record update from the domain name list 116a (step 8).

Next, the analytics service 106 sends a warning message to the user through the secure access service 104 (steps 9 and 10). The warning message indicates that the webpage domain associated with the URL has not been previously visited by the user and requires the user to indicate whether the URL is a malicious website or a safe website.

For example, if the user attempts to open "www.go0gle.com" in step 1, and the domain "go0gle.com" is not recorded in either the blacklist 112 or the whitelist 114, then the user gets a warning message (step 10). If the user realizes the URL is, for example, a phishing website, the user can send feedback to the analytics service 106 through the secure access service 104 (steps 11 and 12).

The administrator 302 receives the feedback from the user via the secure access service 104 (step 13) and can add the URL to the blacklist 112 and remove the URL from the domain name list 116a of the user via the secure access service 104 and the analytics service 106 (step 14).

If, instead, the user in step 11 confirms the URL is not malicious, the URL will be opened, and the record will remain in the domain name list 116a of the user. If the user subsequently opens the same URL, the user can get the warning message unless the visit count of this user to the URL in the domain name list 116 exceeds a certain threshold (e.g., two, three, four, etc.). However, from the second visit onward, the user does not need to confirm whether the webpage is malicious to the analytics service 106.

Figure 4:
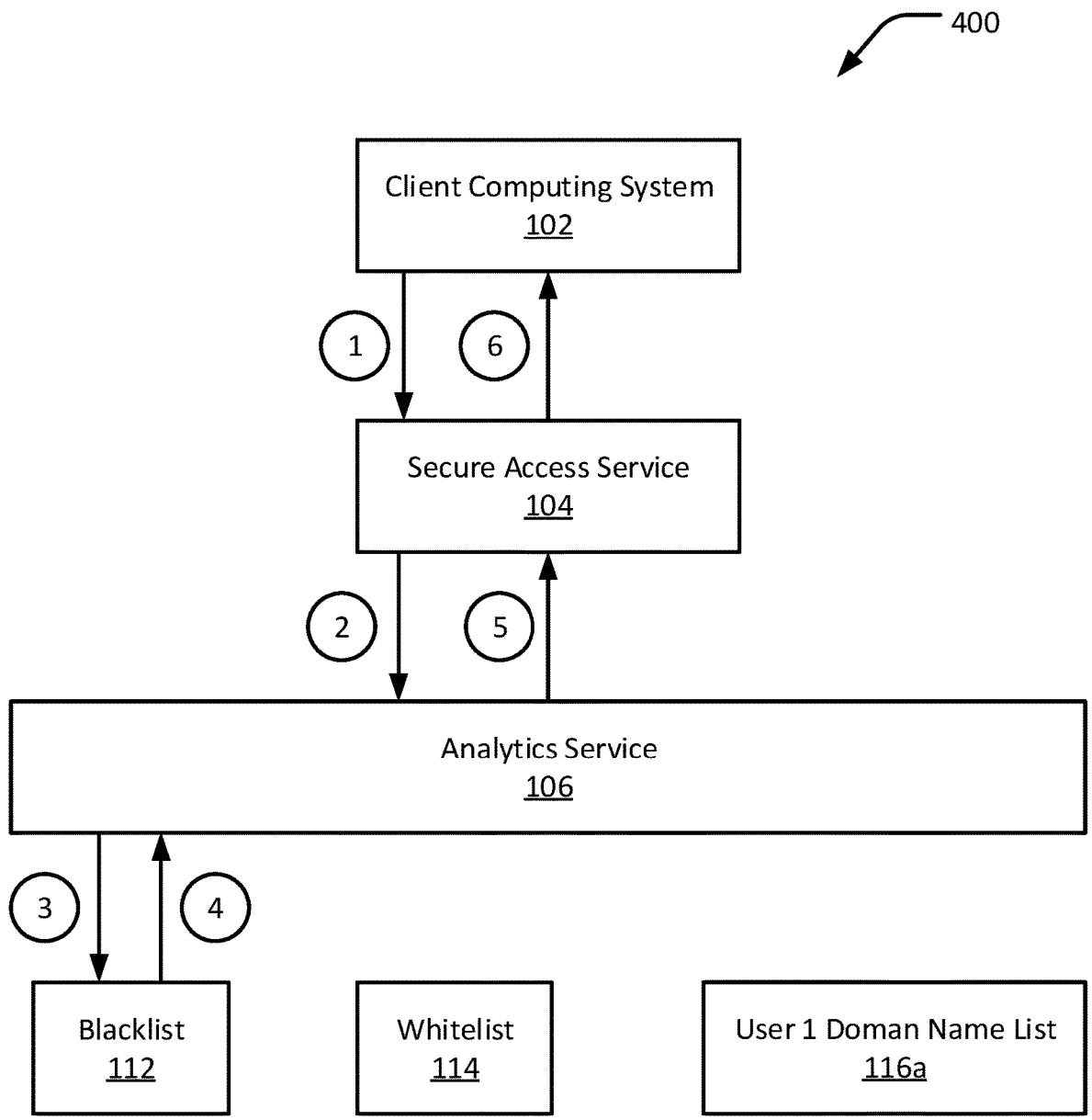

FIG. 4 is a flow diagram of a website access workflow 400, in accordance with another example of the present disclosure. The workflow 400 can occur when a user attempts to open a webpage URL that is in the blacklist 112. In some cases, this is the first attempt by the user to open the webpage. Initially, the user opens a webpage URL, or hyperlink, from within the client computing system 102. The client computing system 102 sends the URL to the secure access service 104 (step 1). In response to receiving the URL from the client computing system 102, the secure access service 104 requests an analysis of the URL by the analytics service 106 (step 2). The analytics service 106 compares the URL with the records in the blacklist 112 to determine whether the URL belongs to a known domain of a malicious websites (step 3). In the example of FIG. 4, the analytics service 106 obtains the result that a matching record was found in the blacklist 112 (step 4). The analytics service 106 transfers the result that the URL is malicious to the secure access service 104 (step 5), and the secure access service 104 prevents the user from continuing to access the URL (step 6).

Figure 5:
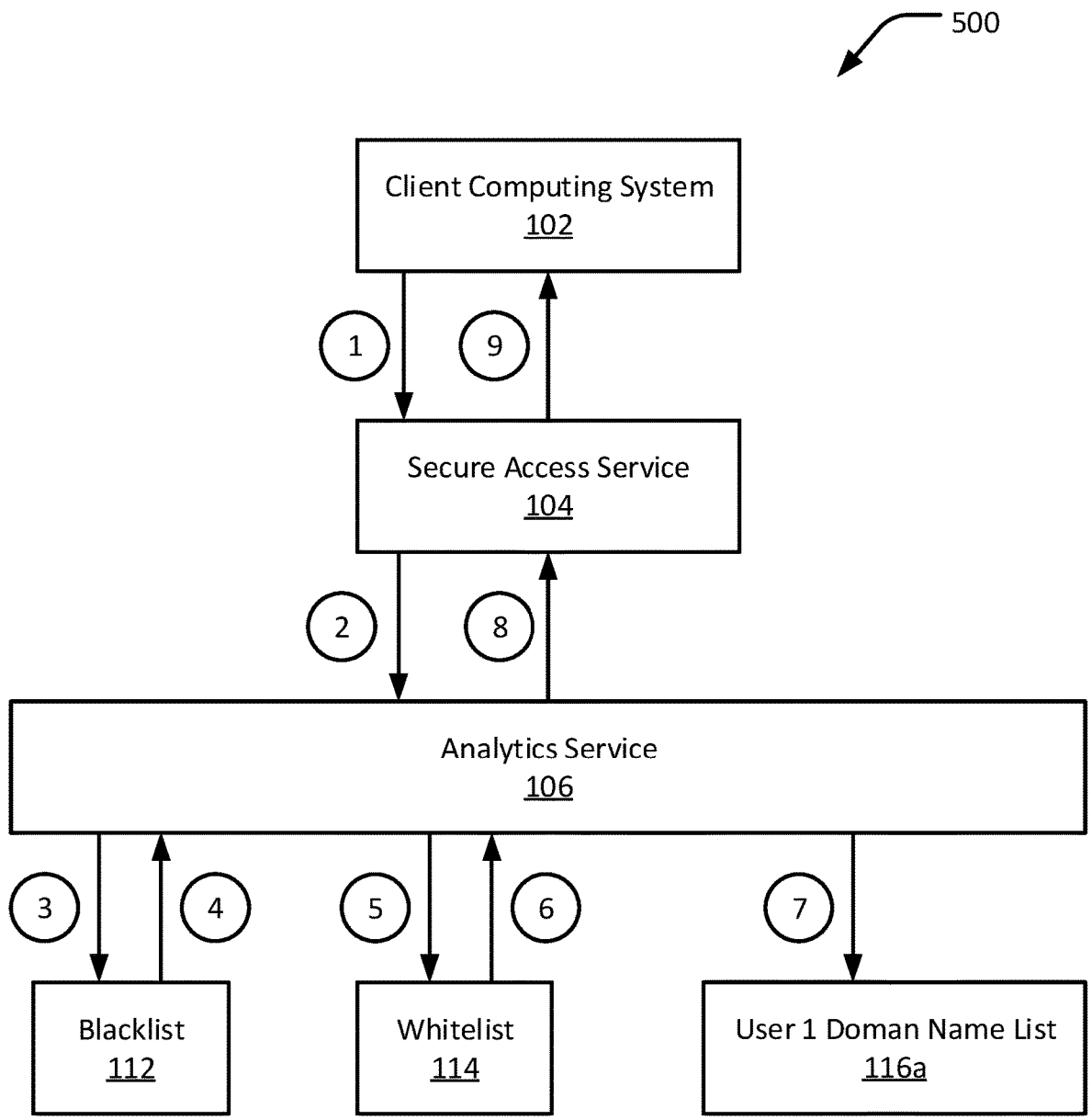

FIG. 5 is a flow diagram of a website access workflow 500, in accordance with yet another example of the present disclosure. The workflow 500 can occur when a user attempts to open a webpage URL that is in the whitelist 114. In some cases, this is the first attempt by the user to open the webpage. Initially, the user opens a webpage URL, or hyperlink, from within the client computing system 102. The client computing system 102 sends the URL to the secure access service 104 (step 1). In response to receiving the URL from the client computing system 102, the secure access service 104 requests an analysis of the URL by the analytics service 106 (step 2). The analytics service 106 compares the URL with the records in the blacklist 112 to determine whether the URL belongs to a known domain of a malicious websites (step 3). In the example of FIG. 5, the analytics service 106 obtains the result that a matching record was not found in the blacklist 112 (step 4).

Next, the analytics service 106 compares the URL with the records in the whitelist 114 to determine whether the URL belongs to a known domain of secure websites (step 5). In the example of FIG. 5, the analytics service 106 obtains the result that a matching record was found in the whitelist 114 (step 6). In response to determining that the URL is safe, the analytics service 106 updates the visit count (increment by one) in the domain name list 116a for the user (step 7).

The analytics service 106 transfers the result that the URL is safe to the secure access service 104 (step 8), and the secure access service 104 permits the user to access the URL (step 9). It will be understood that in some examples, the analytics service 106 can perform the comparison with the whitelist 114 before the blacklist 112.

Figure 6:
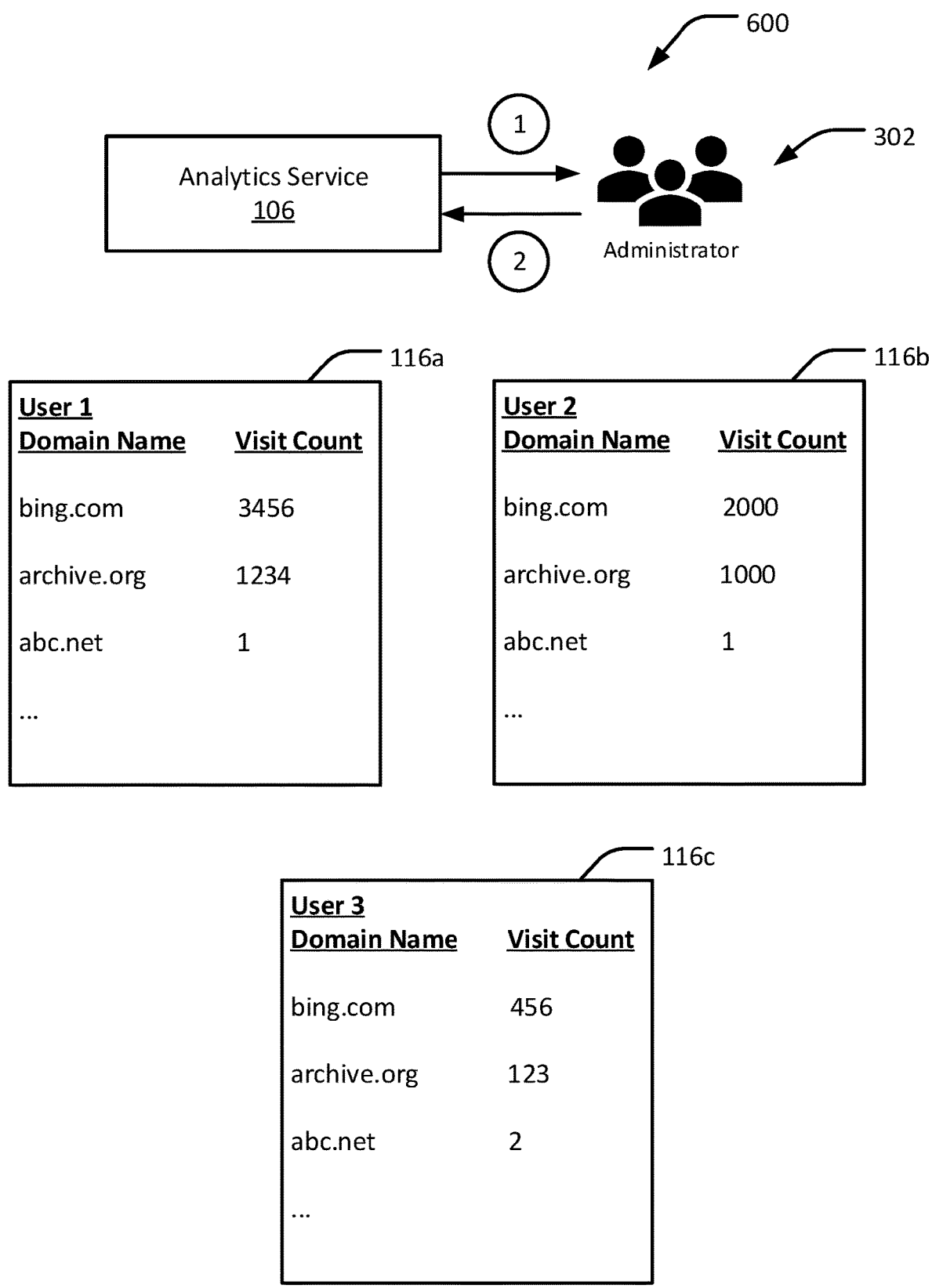

FIG. 6 is a flow diagram of a website access workflow 600, in accordance with yet another example of the present disclosure. The workflow 600 can occur when, if within a period of time, the analytics service 106 detects multiple users attempting to visit a certain URL for the first time (or within a few attempts). The period of time can be set by the administrator 302 to, for example, several minutes (e.g., 1 minute, 2 minutes, 3 minutes, etc.) or several hours (e.g., 1 hour, 2 hours, 3 hours, etc.). Such activity by multiple users (e.g., at least two users or a percentage of users in an organization) or browsers may indicate malicious activity within the enterprise due to a virus or malware, which should be brought to the attention of the administrator 302 for further evaluation and possible action. In this example, the analytics service 106 can send an alarm message to the administrator 302 (step 1). The administrator 302 can diagnose whether such activity triggering the alarm relates to a large-scale network attack and perform suitable maintenance in the analytics service 106 to address the security threat (e.g., adding the URL to the blacklist 112) (step 2).

Figure 7A:
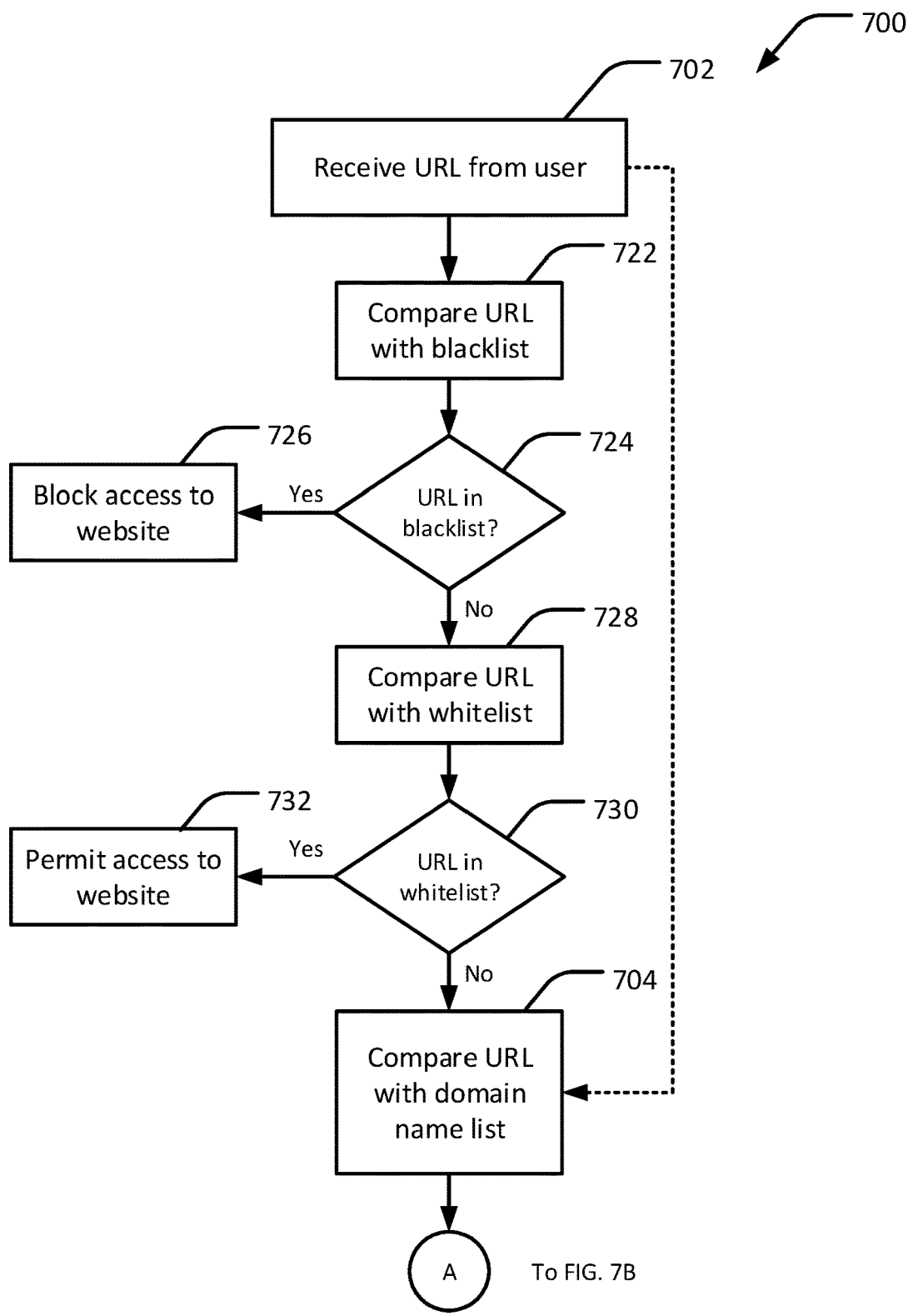
FIGS. 7A-B show a flow diagram of a website access process, in accordance with an example of the present disclosure.
Figure 7B:
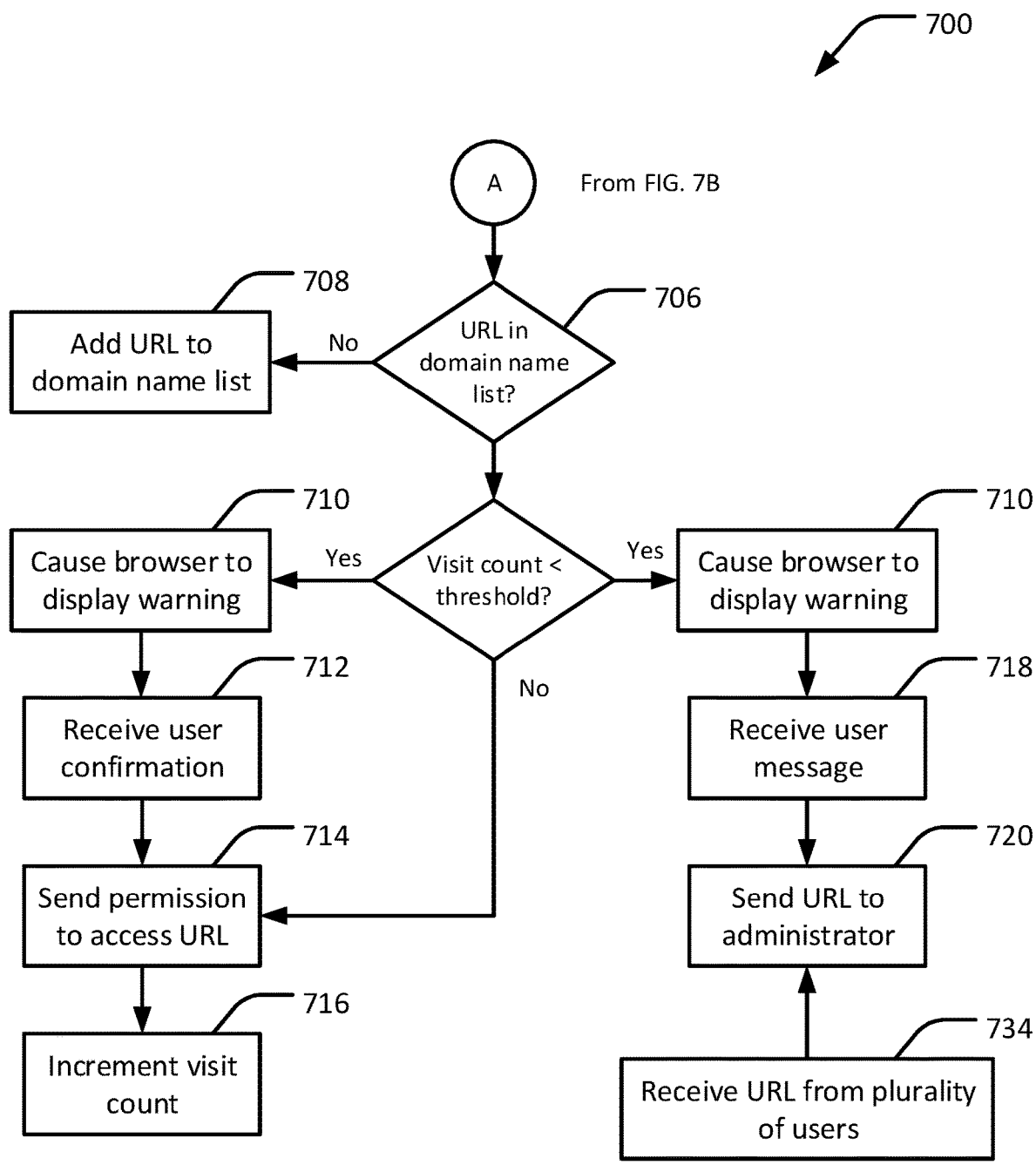

FIGS. 7A-B show a flow diagram of a website access method 700, in accordance with an example of the present disclosure. The process 700 can be implemented, for example, in the system 100 of FIG. 1. The method 700 includes receiving, by a processor and from a browser associated with a user, a Universal Resource Locator (URL) associated with a website. For example, the URL can be a hyperlink in a webpage displayed on the browser or an Internet Protocol (IP) address or website address that the user has manually entered into the browser. The method 700 further includes comparing 704, by the processor, the URL with at least one domain name in a user domain name list associated with the user to determine whether the URL exists in the domain name list. As noted above, a domain name list can be established for each unique user, such as shown in FIG. 6. The domain name list maintains a list of URLs and corresponding visit counts by that user to the respective website(s). In response to determining 706 that the URL does not exist in the user domain name list, the method 700 further includes adding, by the processor, 708 the URL to the user domain name list. This occurs the first time the user has attempted to visit the web site.

In response to a visit count representing a number of visits to the URL by the user being less than a threshold value, the method 700 includes causing 710, by the processor, the browser to display a warning message. The warning message can indicate, among other things, that the URL the user is attempting to access is potentially malicious or otherwise insecure and requesting the user to confirm that the website is not malicious. In response to receiving 712, by the processor and from the browser, a user confirmation that the website is not malicious, sending 714, by the processor, permission to the browser to access the website using the URL, and incrementing 716, by the processor, the visit count for the respective URL in the domain name list by one. In cases where the user does not confirm that the website is not malicious, the method 700 includes, in response to receiving 718, by the processor and from the browser, a user message that the website is malicious, sending 720, by the processor, the URL to an administrator.

In some examples, the method 700 includes comparing 722, by the processor, the URL with at least one domain name in a blacklist to determine whether the URL exists in the blacklist and, in response to determining 724 that the URL exists in the blacklist, causing 726, by the processor, the browser to block access to the website. For example, if the user attempts to access a URL that is already in the blacklist, the browser will block access to the website without user intervention. If, on the other hand, the URL does not exist in the blacklist, the method 700 includes comparing 728, by the processor, the URL with at least one domain name in a whitelist to determine whether the URL exists in the whitelist and, in response to determining 730 that the URL exists in the whitelist, causing 732, by the processor, the browser to permit access the website. For example, if the user attempts to access a URL that is already in the whitelist, the browser will permit access to the website without user intervention. In some examples, when the URL is in the whitelist, the URL is added to the domain name list of the respective user and the visit count for the URL is also incremented in the domain name list.

In some examples, the method 700 includes receiving 734, by a processor and from a plurality of browsers associated with a plurality of users within a predetermined period of time, a Universal Resource Locator (URL) associated with a website and sending 720, by the processor, the URL to an administrator. This can occur, for example, when, if within a period of time, the analytics service 106 detects multiple users attempting to visit a certain URL for the first time (or within a few attempts). In this example, the analytics service 106 can send an alarm message to the administrator 302. The administrator 302 can diagnose whether such activity triggering the alarm relates to a large-scale network attack and perform suitable maintenance in the analytics service 106 to address the security threat (e.g., adding the URL to the blacklist 112).

Example Computing Device

Figure 8:
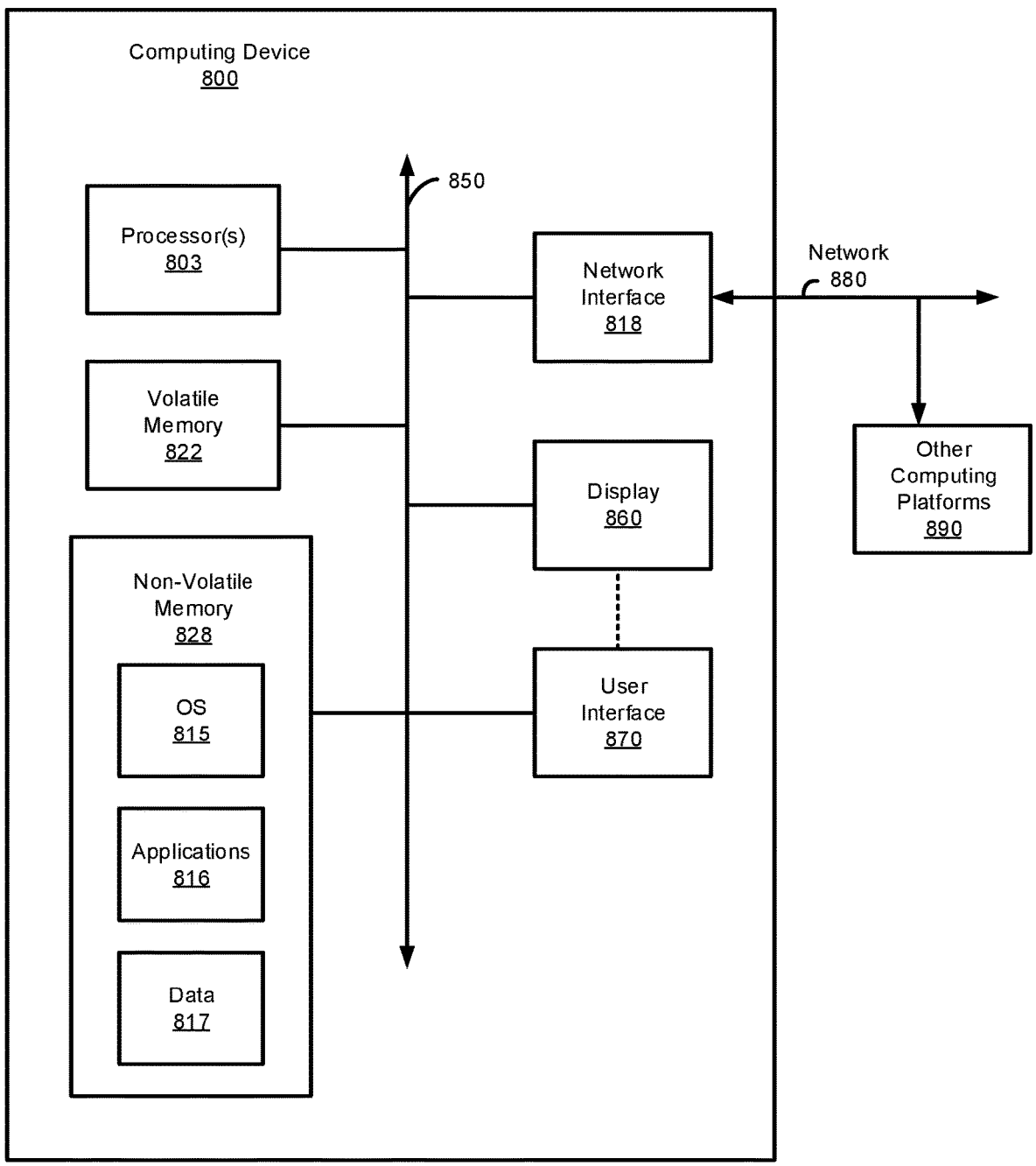
FIG. 8 is a block diagram of a computing device configured to implement various systems and processes in accordance with examples disclosed herein.

FIG. 8 is a block diagram of a computing device configured to implement various systems and processes in accordance with examples disclosed herein. In some examples, the system 800 can include a workstation, a laptop computer, a tablet, a mobile device, or any suitable computing or communication device. One or more components of the system 800, including the client computing system 102, the secure access service 104, and/or the analytics service 106, can include or otherwise be executed using one or more processors 803, volatile memory (e.g., random access memory (RAM)) 822, non-volatile machine-readable mediums (e.g., a non-volatile memory 828), one or more network or communication interfaces 818, a user interface (UI) 870, a display 860, and a communications bus 850. The non-volatile (non-transitory) machine-readable mediums 828 can include: one or more hard disk drives (HDDs) or other magnetic or optical machine-readable storage media; one or more machine-readable solid state drives (SSDs), such as a flash drive or other solid-state storage media; one or more hybrid machine-readable magnetic and solid-state drives; and/or one or more virtual machine-readable storage volumes, such as a cloud storage, or a combination of such physical storage volumes and virtual storage volumes or arrays thereof. The user interface 870 can include one or more input/output (I/O) devices (e.g., a mouse, a keyboard, a microphone, one or more speakers, etc.). The display 860 can provide a graphical user interface (GUI) and in some cases, may be a touchscreen or any other suitable display device. The non-volatile memory 828 stores an operating system (OS), one or more applications, and data such that, for example, computer instructions of the operating system and the applications, are executed by processor(s) out of the volatile memory. In some examples, the volatile memory 822 can include one or more types of RAM and/or a cache memory that can offer a faster response time than a main memory. Data can be entered through the user interface 870. Various elements of the system 800 can communicate via the communications bus 850 or the network interface 818.

The computing device 800 can also be referred to as a client device, computing device, endpoint device, computer, or a computer system. The computing device 800 is shown as an example client computing system 102, secure access service 104, and/or analytics service 106, and can be implemented within any computing or processing environment with any type of physical or virtual machine or set of physical and virtual machines that can have suitable hardware and/or software capable of operating as described herein.

The non-volatile memory 828 stores an operating system (OS) 815, one or more applications or programs 816, and data 817. The OS 815 and the application 816 include sequences of instructions that are encoded for execution by processor(s) 803. Execution of these instructions results in manipulated data. Prior to their execution, the instructions can be copied to the volatile memory 822. In some examples, the volatile memory 822 can include one or more types of RAM and/or a cache memory that can offer a faster response time than a main memory. Data can be entered through the user interface 870 or received from the other I/O device(s), such as the network interface 818. The various elements of the device 800 described above can communicate with one another via the communications bus 850.

The processor(s) 803 can be implemented by one or more programmable processors to execute one or more executable instructions, such as a computer program, to perform the functions of the system. As used herein, the term "processor" describes circuitry, hardware, or firmware that performs a function, an operation, or a sequence of operations. The function, operation, or sequence of operations can be hard coded into the circuitry or a data storage device, or soft coded by way of instructions held in the storage device and executed by the circuitry. A processor can perform the function, operation, or sequence of operations using digital values and/or using analog signals. In some examples, the processor can include one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory. The processor(s) 803 can be analog, digital or mixed. In some examples, the processor(s) 803 can be one or more local physical processors or one or more remotely located physical processors. A processor including multiple processor cores and/or multiple processors can provide functionality for parallel, simultaneous execution of instructions or for parallel, simultaneous execution of one instruction on more than one piece of data.

The network interfaces 818 can include one or more interfaces to enable the computing device 800 to access a computer network 880 such as a Local Area Network (LAN), a Wide Area Network (WAN), a Personal Area Network (PAN), or the Internet through a variety of wired and/or wireless connections, including cellular connections and Bluetooth connections. In some examples, the network 880 may allow for communication with other computing devices 890, to enable distributed computing. The network 880 can include, for example, one or more private and/or public networks over which computing devices can exchange data.

In described examples, the computing device 800 can execute an application on behalf of a user of a client device. For example, the computing device 800 can execute one or more virtual machines managed by a hypervisor. Each virtual machine can provide an execution session within which applications execute on behalf of a user or a client device, such as a hosted desktop session. The computing device 800 can also execute a terminal services session to provide a hosted desktop environment. The computing device 800 can provide access to a remote computing environment including one or more applications, one or more desktop applications, and one or more desktop sessions in which one or more applications can execute.

The foregoing description and drawings of various embodiments are presented by way of example only. These examples are not intended to be exhaustive or to limit the present disclosure to the precise forms disclosed. Alterations, modifications, and variations will be apparent in light of this disclosure and are intended to be within the scope of the present disclosure as set forth in the claims. For example, the processes disclosed herein each represent a sequence of acts in a particular example. Some acts are optional and, as such, can be omitted in accord with one or more examples. Additionally, the order of acts can be altered, or other acts can be added, without departing from the scope of the apparatus and methods discussed herein.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A method of accessing a website, the method comprising:
    receiving, by a processor and from a browser associated with a user, a Universal Resource Locator (URL) associated with a website;
    comparing, by the processor and using an analytics service, the URL with at least one domain name in a blacklist to determine whether the URL exists in the blacklist;
    in response to determining that the URL exists in the blacklist, causing, by the processor, the browser to block access to the website,
    in response to the URL not existing in the blacklist, comparing, by the processor, the URL with at least one domain name in a whitelist to determine whether the URL exists in the whitelist;
    in response to determining that the URL exists in the whitelist, causing, by the processor, the browser to permit access to the website,
    in response to the URL not existing in the whitelist, comparing, by the processor, and using an analytics service, the URL with at least one domain name in a user domain name list associated with a specific user to determine whether the URL exists in the user domain name list, wherein the comparing further comprises:
        identifying whether the URL is similar to a known secure domain in the whitelist, to indicate a potential phishing risk;
        in response to determining that the URL meets a predefined criteria for establishing similarity to a known whitelisted website, informing an administrator for further investigation of the URL;
        identifying whether a plurality of users are attempting to visit the URL for the first time within a predefined period of time;
        in response to determining that multiple users are attempting to access the URL for the first time, alerting the administrator of a possible network attack;
        in response to determining that the URL does not exist in the user domain name list, adding, by the processor, the URL to the user domain name list and setting the URL visit count to one;
        in response to determining that the URL does exist in the user domain name list, comparing the URL visit count to a threshold value;
        in response to the URL visit count representing a number of visits to the URL by the user being less than a threshold value, causing, by the processor, the browser to display a warning message, wherein the displayed warning message comprises:
            a prompt for user confirmation to indicate whether the URL is a malicious website or a safe user website;
        in response to the user confirming the URL is malicious, causing the analytics service to block access to the URL;
        in response to the user confirming the URL is a safe user website, causing the analytics service to permit access to the URL; and
        in response to the URL visit count being greater than a threshold value, causing, by the processor and using the analytics service, the browser to permit access to the website without warning.

2. The method of claim 1, further comprising, in response to sending permission to the browser to access the website using the URL, incrementing, by the processor, the URL visit count by one.

3. The method of claim 1, further comprising, in response to receiving, by the processor and from the browser, a user message that the website is malicious, sending, by the processor, the URL to an administrator.

4. A computer program product, including one or more non-transitory machine-readable mediums having instructions encoded thereon that when executed by at least one processor cause a process to be carried out, the process comprising:
    receiving, from a browser associated with a user, and using an analytics service, a Universal Resource Locator (URL) associated with a website;

comparing, by the processor and using an analytics service, the URL with at least one domain name in a blacklist to determine whether the URL exists in the blacklist;
in response to determining that the URL exists in the blacklist, causing, by the processor, the browser to block access to the website,
in response to the URL not existing in the blacklist, comparing, by the processor, the URL with at least one domain name in a whitelist to determine whether the URL exists in the whitelist;
in response to determining that the URL exists in the whitelist, causing, by the processor, the browser to permit access to the website,
in response to the URL not existing in the whitelist, comparing the URL with at least one domain name in a user domain name list associated with a specific user to determine whether the URL exists in the user domain name list, wherein the comparing further comprises:
 identifying whether the URL is similar to a known secure domain in the whitelist, to indicate potential phishing risk;
  in response to determining that the URL meets a predefined criteria for establishing similarity to a known whitelisted website, informing an administrator for further investigation of the URL;
 identifying whether a plurality of users are attempting to visit the URL for the first time within a predefined period of time;
 in response to determining that multiple users are attempting to access the URL for the first time, alerting the administrator of a possible network attack;
 in response to determining that the URL does not exist in the user domain name list, adding the URL to the user domain name list and setting the URL visit count to one;
 in response to determining that the URL does exist in the user domain name list, comparing the URL visit count to a threshold value;
 in response to the URL visit count representing a number of visits to the URL by the user being less than a threshold value, causing the browser to display a warning message, wherein the displayed warning message comprises:
  a prompt for user confirmation to indicate whether the URL is a malicious website or a safe user website;
  in response to the user confirming the URL is malicious, causing the analytics service to block access to the URL;
  in response to the user confirming the URL is a safe user website, causing the analytics service to permit access to the URL; and
 in response to the URL visit count being greater than a threshold value, causing, by the processor and using the analytics service, the browser to permit access to the website without warning.

5. The computer program product of claim 4, wherein the process further comprises, in response to sending permission to the browser to access the website using the URL, incrementing the URL visit count by one.

6. The computer program product of claim 4, wherein the process further comprises, in response to receiving, from the browser, a user message that the website is malicious, sending, by the processor, the URL to an administrator.

7. A system comprising:
a storage; and
at least one processor operatively coupled to the storage, the at least one processor configured to execute instructions stored in the storage that when executed cause the at least one processor to carry out a process comprising receiving, from a browser associated with a user, and using an analytics service, a Universal Resource Locator (URL) associated with a website;
comparing, by the processor and using an analytics service, the URL with at least one domain name in a blacklist to determine whether the URL exists in the blacklist;
in response to determining that the URL exists in the blacklist, causing, by the processor, the browser to block access to the website,
in response to the URL not existing in the blacklist, comparing, by the processor, the URL with at least one domain name in a whitelist to determine whether the URL exists in the whitelist;
in response to determining that the URL exists in the whitelist, causing, by the processor, the browser to permit access to the website,
in response to the URL not existing in the whitelist, comparing the URL with at least one domain name in a user domain name list associated with a specific the user to determine whether the URL exists in the user domain name list, wherein the comparing further comprises:
 identifying whether the URL is similar to a known secure domain in the whitelist, to indicate potential phishing risk;
  in response to determining that the URL meets a predefined criteria for establishing similarity to a known whitelisted website, informing an administrator for further investigation of the URL;
 identifying whether a plurality of users are attempting to visit the URL for the first time within a predefined period of time;
 in response to determining that multiple users are attempting to access the URL for the first time, alerting the administrator of a possible network attack;
 in response to determining that the URL does not exist in the user domain name list, adding the URL to the user domain name list and setting the URL visit count to one;
 in response to determining that the URL does exist in the user domain name list, comparing the URL visit count to a threshold value;
 in response to the URL visit count representing a number of visits to the URL by the user being less than a threshold value, causing the browser to display a warning message, wherein the displayed warning message comprises:
  a prompt for user confirmation to indicate whether the URL is a malicious website or a safe user website;
  in response to the user confirming the URL is malicious, causing the analytics service to block access to the URL;
  in response to the user confirming the URL is a safe user website, causing the analytics service to permit access to the URL; and
 in response to the URL visit count being greater than a threshold value, causing, by the processor and using the analytics service, the browser to permit access to the website without warning.

8. The system of claim 7, wherein the process further comprises, in response to sending permission to the browser to access the website using the URL, incrementing the URL visit count by one.

9. The system of claim 7, wherein the process further comprises, in response to receiving, from the browser, a user message that the website is malicious, sending, by the processor, the URL to an administrator.

* * * * *